Oct. 5, 1965  F. EBERL  3,209,665
DELAYED ACTION MECHANISM FOR A CAMERA SHUTTER
Filed April 9, 1963  2 Sheets-Sheet 1

Oct. 5, 1965  F. EBERL  3,209,665
DELAYED ACTION MECHANISM FOR A CAMERA SHUTTER
Filed April 9, 1963  2 Sheets-Sheet 2

3,209,665
DELAYED ACTION MECHANISM FOR A CAMERA SHUTTER
Franz Eberl, Munich, Germany, assignor to Compur-Werk Gesellschaft mit beschrankter Haftung & Company, Munich, Germany, a company of Germany
Filed Apr. 9, 1963, Ser. No. 271,817
Claims priority, application Germany, Apr. 11, 1962,
C 26,719
1 Claim. (Cl. 95—53.3)

The present invention relates to a delayed action mechanism for a shutter and more particularly to a mechanism which can be readily rendered inoperative even after it has been cocked.

Delayed action mechanisms or pre-timers which permit self portraits by providing a predetermined time delay after the shutter actuating lever is tripped before release of the shutter are well known in the art. Such mechanisms may include a lever associated with an escapement mechanism, movement of the lever to a cocked position setting the mechanism so that the run down of the escapement provides a time delay between actuation of the shutter lever and opening of the shutter. Such mechanisms generally permitted elimination of the time delay even after the mechanism is cocked simply by returning the lever to the uncocked position. However, with such systems it is necessary to uncock the mechanism after the shutter has run down by setting the entire escapement mechanism in motion. This causes considerable wear on the escapement and the sound resulting from the run down of the escapement after the shutter has opened and closed disturbs the camera user.

In another known form of delayed action mechanism there is provided a slide which is shiftable about the optical axis of the camera for loading the delayed action mechanism. In such mechanisms there is provided a handle which projects from the shutter housing and which may be pushed in to unlatch the slide for return movement. However, it is possible that the time delay action may be cancelled by inadvertent movement of the handle.

According to the present invention a delayed action mechanism is provided which can be cocked and, if necessary, the time delay cancelled by uncocking the loaded spring without movement of the escapement mechanism. This prevents undue wear on the mechanism and avoids the other disadvantages of prior art mechanisms pointed out hereinbefore.

According to the present invention the escapement mechanism, which controls the release of the shutter when the time delay mechanism is operative, is in engagement with a primary element which is provided with a plurality of propulsion apertures. Mounted on the same shaft with the primary element is a driving plate which has a plurality of impelling tongues engageable with the propulsion apertures. The driving plate is urged by spring means to an uncocked position. There is further provided a cocking lever journalled on the same shaft with the driving plate and primary element. Rotation of the cocking lever to a cocked position rotates the driving plate, loads the spring and causes the impelling tongues to move over the primary element and engage in propulsion apertures therein. The delayed action mechanism will provide a time delay prior to actuation of the shutter by run down of the escapement mechanism after the trigger lever is actuated. However, the delayed action mechanism may be cancelled by return of the cocking lever to uncocked position. The cocking lever is provided with lugs which engage the impelling tongues and draw the tongues from engagement with the propulsion apertures in the primary element thus permitting the loaded spring to be de-energized. The mechanism may thus be uncocked without actuation of the escapement.

A primary object of the present invention is to provide a delayed action mechanism for a camera shutter wherein the mechanism includes an escapement which need not be actuated if it is desired to cancel the time delay after cocking of the mechanism.

Other objects and many of the attendant advantages of the present invention will become more readily apparent upon consideration of the following detailed description in connection with the accompanying drawings wherein.

Figure 1:
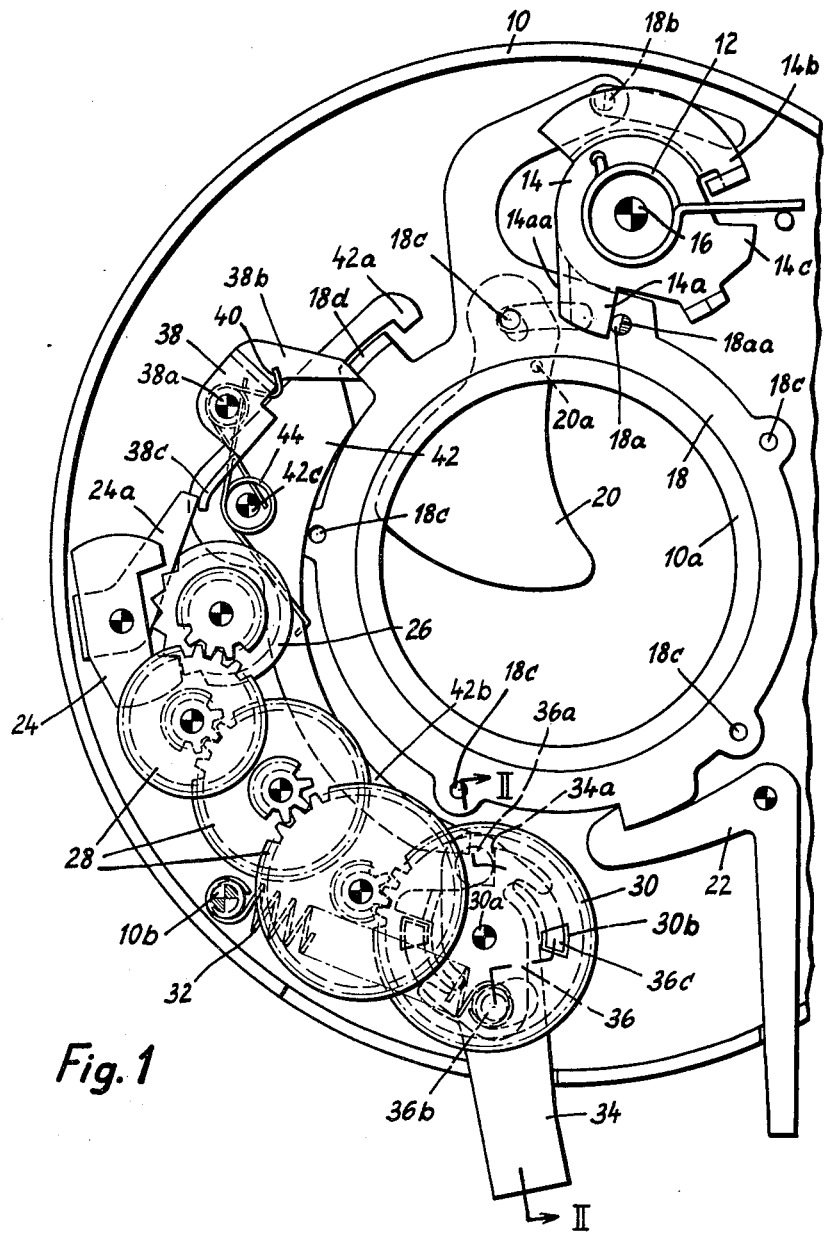
FIGURE 1 is a plan view of the shutter, certain parts being omitted for the sake of clarity.

The shutter assembly illustrated in FIGURE 1 is a cocking shutter of generally well known construction, the mechanism being installed in a housing 10. The main spring 12 of the shutter operates a main driving member 14 having a cocking spindle 16 which projects from the shutter housing 10. This spindle is coupled in known manner to a transmission gear (not shown) associated with the camera, for example with the film feed gear of the camera. Disposed around the objective tube 10a of the shutter housing 10 is a rotatably mounted blade ring 18 which has two driving pins 18a, 18b as well as a plurality of blade operating pins 18c to move the shutter blades 20, each of which is pivotally mounted at 20a. The shutter illustrated has, for example, five shutter blades 20 of which only one has been illustrated in FIGURE 1 for the sake of clarity.

The parts of the shutter are shown in FIGURE 1 in the cocked condition, the blade driving ring 18 being held cocked by a trigger lever 22. As soon as the user operates this trigger lever, the main driving member 14 turns counter-clockwise under the force of a spring 12, and the projection 14a of this member turns the blade ring 18, through the pin 18a, in the clockwise direction until the shutter blades are opened. In the open position of the blades, a lug 14b on the main driving member 14 engages with a mechanism which controls the exposure period. The closure movement of the blades 20 is brought about by the fact that, after the projection 14a has slipped past the pin 18a, another projection 14c on the main driving member 14 engages the pin 18b carried by the shutter blade driving ring 18 and moves the latter in the counter-clockwise direction to close the blades 20. In the rest position the blades 20 resume the position illustrated in FIGURE 1.

To re-cock the main driving member 14 after a photograph has been taken, the cocking spindle 16 is turned in the clockwise direction, an oblique edge 14aa of the projection 14a sliding over the pin 18a, which also has an oblique edge 18aa, and pushes the same away, against the action of a spring (not shown) in the axial direction until the projection 14a can move behind pin 18a. As a consequence, in the cocked position the projection 14a is again located behind the pin 18a of the blade driving ring 18 which is stationary during the cocking.

Figure 3:
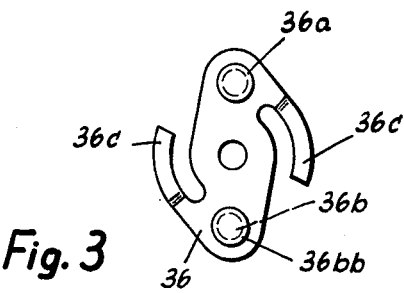
FIGURES 3 to 5 are plan views of individual elements of time delay mechanism shown in FIGURES 1 and 2.
Figure 4:
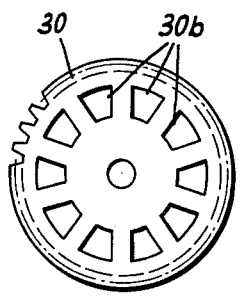
Figure 2:
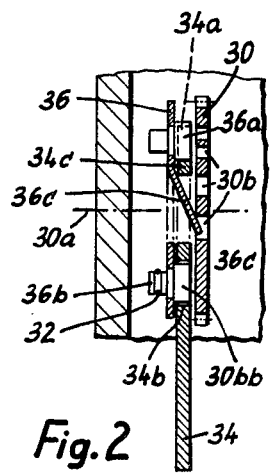
FIGURE 2 is a cross-section on the line II—II of FIGURE 1.
Figure 5:
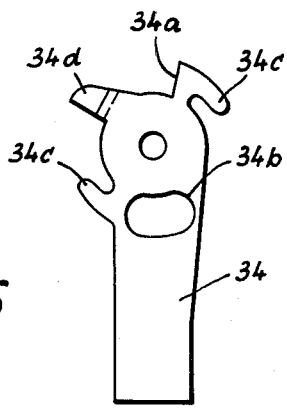

In addition to the exposure control mechanism a delayed action mechanism or pre-timer, which can be optionally brought in or cut out, is incorporated in the shutter housing 10, this mechanism delaying for about 12 seconds from the moment at which the trigger is operated before the commencement of opening of the shutter blades, so as to allow for self-portraits. This delayed action mechanism or pre-timer includes a pallet 24, an escapement wheel 26, and a pinion gearing 28, the primary element of which—a toothed pinion 30—is acted on by a driving spring 32. This means for bringing in or cutting out the delayed action motion in accordance with the present invention is constructed as follows:

The primary element 30 is freely mounted for rotation on its bearing pin 30a and, as shown by FIGURE 4, is provided with a plurality of window-like propulsion apertures 30b. For the sake of clarity of illustration, only two of these openings have been shown in FIGURE 1. A cocking lever 34 (FIGURE 5) is journalled or loosely mounted for rotation on a bearing pin 30a beneath the primary element 30, the nose 34a of this lever cooperating with a driving pin 36a of a driving plate 36 (FIGURE 3) which is mounted, again freely rotatable upon the mounting pin 30a, beneath the cocking lever 34. Secured to a further pin 36b of the plate 36 is one end of the spring 32 which powers the delayed action mechanism, the other end thereof being anchored at 10b to the shutter housing 10. The head 36bb of the pin 36b engages in a slot 34b in the cocking lever 34. In addition the latter has two lugs 34c and a nose 34d, the purpose of which will be explained later. The plate 36 has two impelling tongues 36c which are bowed resiliently upwards and which project into apertures 30b in the primary element 30 of the delayed action mechanism.

Also rotatably mounted in the shutter housing 10 is a double-armed latching lever 38, loosely rotatable about a stationary pin 38a and biassed by a spring 40 which urges it in the counter-clockwise direction. An arm 38b of this latching lever projects into the path of travel of a lug 18d on the blade driving ring 18, while the other arm 38c thereof cooperates with a lug 24a secured to element 24. A second latching lever 42 is mounted for pivoting about a stationary pin 42c in the shutter housing 10 and is biassed by a spring 44 which urges this latching lever in the clockwise direction. One arm of the second latching lever 42 is formed as a hooked catch 42a which projects into the path of travel of the lug 18d of the blade driving ring 18, while the other arm 42b is placed in the path of movement of the nose 34d of the lever 34 which cocks the delayed action mechanism.

When this latter mechanism is to be brought into use, the cocking lever 34 has to be moved in the counter-clockwise direction. Thus the cocking of the delayed action mechanism can take place with any shutter condition, that is to say irrespective of whether the main driving member 14 is cocked or uncocked.

During the motion which occurs in cocking the delayed action mechanism, the nose 34a of the cocking lever 34 carries with it the driving plate 36 mounted on pin 36a, so that this plate will be turned in the same direction. At this time the impelling tongues 36c slide resiliently over some of the apertures 30b in the primary element 30 until they drop into new apertures corresponding to the cocked condition. The primary element 30 remains stationary during this cocking of delayed action mechanism, because the latching lever 38 is held in the clockwise direction by the lugs 18d of the blade driving ring 18 so that its arm 38c, through engagement with lug 24a, prevents the element 24 from moving.

If the trigger 22 is operated after the shutter has been cocked, the blade driving ring 18, now released, moves through a small angle until the lugs 18d thereof come into engagement with the catch hook 42a. The first latching lever 38 is released by this initial movement of the blade driving ring 18, and is thereby turned in the counterclockwise direction to free element 24. The motive spring 32 of the delayed action mechanism can now come into effect and turn plate 36 in the clockwise direction, the tongues 36c thereof moving the primary element 30 of the delayed action mechanism in the same direction. Moved by the pin 36a of plate 36, the cocking lever 34 also moves towards its rest position.

The delay imposed by the run-down of the delayed action mechanism, retained by element 24, lasts about 12 seconds. At the end of this delay period, the nose 34d of the cocking lever abuts the arm 42b of the latching lever 42, pivoting the lever 42 whereby the catch 42a releases the lug 18d of the blade ring 18 so that the blade ring and shutter operating mechanism can function in a normal manner to open and close the blades 20.

Should the user wish to cancel the effect of the delayed action mechanism, even if the latter has previously been cocked, it is only necessary to move back the cocking lever 34 by hand in the direction opposite to the cocking direction. It is of no moment whether the shutter itself is cocked or not. During this movement of the cocking lever to the uncocked position the two lugs 34c of the cocking lever 34 slip under the tongues 36c of the stationary driving plate 36 so that the engagement between the tongues and the propulsion apertures 30b is broken. The driving plate 36, now freed, runs back to its rest position under the action of the unloading motive spring 32. It is to be noted that in the event of this optional cutting out of the delayed action mechanism by restoration of its cocking lever, only the motive spring is unloaded, while all the remainder of the delayed action gear remains immobile, thereby preventing wear on the escapement mechanism.

It is an advantage of the present invention that the bringing in or cutting out of the delayed action mechanism can be repeated as often as required and without regard to the operative condition of the shutter, in that only the cocking lever of the delayed action mechanism has to be moved in one or the other direction. As a consequence operation of the shutter is simplified, and the camera is more clearly ready for use at any time.

Obviously, many modifications and variations of the present invention are possible in light of the above teachings. What is claimed as new and is desired to be secured by Letters Patent is:

A photographic shutter mechanism comprising a rotatable blade ring for opening and closing the shutter blades, a lug on said blade ring, means for opening and closing the shutter blades including a trigger lever, time delay mechanism comprising an escapement having a primary element, a first latching lever engageable with the lug on said blade ring locking said escapement, said first latching lever being released upon actuation of said trigger lever, a second latching lever, said second latching lever engageable with said lug and preventing actuation of the shutter until the escapement has run down when the time delay mechanism is operative, a cocking lever and driving plate rotatably mounted axially with said primary element, a nose on said cocking lever engageable with said second latching lever to pivot said lever out of engagement with the lug on the blade ring, a pin on said driving plate engaging a slot in the cocking lever, spring means connected to said driving plate urging said plate to an uncocked position, tongues on said driving plate engaging apertures in the primary element, rotation of the cocking lever to a cocked position rotating the driving plate to cause the tongues to pass over the apertures and engage selected apertures at the end of the rotative movement, the spring means being loaded in the cocked position of the driving plate, release of the first latching lever by actuation of the trigger lever releasing the escapement whereby the driving plate drives the primary element and rotates the cocking lever to a position wherein the nose engages the second latching lever to release said last named lever from engagement with the lug on the blade ring to actuate the shutter a predetermined time after actuation of the trigger lever, and means comprising projections on said cocking lever for drawing the tongues on said driving plate out of engagement with the apertures in said primary element when the cocking lever is manually moved from cocked to uncocked position whereby the time delay mechanism may be rendered inoperative by unloading said spring means without running down the escapement.

References Cited by the Examiner

UNITED STATES PATENTS 2,447,151 4/48 Ascoli _____ 58—22.9 X
2,727,445 12/55 Rentschler _____ 95—53.6 X NORTON ANSHER, *Primary Examiner.*

JOHN M. HORAN, *Examiner.*